(12) United States Patent
Luttels

(10) Patent No.: US 11,690,367 B2
(45) Date of Patent: Jul. 4, 2023

(54) ARTHROPOD TRAP AND EXTERMINATION METHOD

(71) Applicant: CTB, Inc., Milford, IN (US)

(72) Inventor: Frank Luttels, Beesel (NL)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 17/346,004

(22) Filed: Jun. 11, 2021

(65) Prior Publication Data

US 2021/0400945 A1    Dec. 30, 2021

Related U.S. Application Data

(60) Provisional application No. 63/044,765, filed on Jun. 26, 2020.

(51) Int. Cl.
*A01M 1/20* (2006.01)
*A01K 31/12* (2006.01)
*A01M 1/04* (2006.01)

(52) U.S. Cl.
CPC ........... *A01M 1/2094* (2013.01); *A01K 31/12* (2013.01); *A01M 1/04* (2013.01); *A01M 2200/011* (2013.01)

(58) Field of Classification Search
CPC .......... A01M 1/00; A01M 1/02; A01M 1/023; A01M 1/026; A01M 1/10; A01M 1/103; A01M 1/12; A01M 1/20; A01M 1/2011; A01M 1/2094; A01K 31/12
USPC ................. 43/107, 132.1, 121; 119/531–537
See application file for complete search history.

(56) References Cited

U.S. PATENT DOCUMENTS

| 727,454 | A | * | 5/1903 | Royce | A01K 31/12 119/534 |
| 856,557 | A | * | 6/1907 | Townsend | A01K 31/12 119/535 |
| 938,234 | A | * | 10/1909 | Herman | A01K 31/12 119/534 |
| 1,047,697 | A | * | 12/1912 | Pond | A01K 31/12 119/534 |
| 1,201,720 | A | * | 10/1916 | Hagermann | 43/123 |
| 1,209,462 | A | * | 12/1916 | Mack | A01K 31/12 119/532 |

(Continued)

FOREIGN PATENT DOCUMENTS

| CA | 2295898 C | * | 7/2007 | ............. A01K 51/00 |
| CH | 174009 A | * | 12/1934 | ............. A01K 31/12 |

(Continued)

OTHER PUBLICATIONS

International Search Report and Written Opinion for PCT/US21/37104 dated Sep. 22, 2021.

*Primary Examiner* — Darren W Ark
(74) *Attorney, Agent, or Firm* — Clark Hill PLC

(57) ABSTRACT

The present disclosure describes an apparatus, system, and method for trapping and exterminating arthropods, particularly red mites. The apparatus includes an opaque housing and a heat strip configured to have separate temperature zones. The method includes warming the heat strip to lure the mites into the trap, heating outer heat strip segments to drive the mites toward the center of the trap, and then raising the entire heat strip to a temperature sufficient to exterminate the mites. The system includes placing one or more of the traps in animal hold structures, including nesting boxes in poultry houses.

12 Claims, 7 Drawing Sheets

(56) References Cited

U.S. PATENT DOCUMENTS

| | | | | |
|---|---|---|---|---|
| 1,213,638 A | * | 1/1917 | Henderson et al. | A01M 29/34 43/109 |
| 1,223,016 A | * | 4/1917 | Young | 43/123 |
| 1,233,533 A | * | 7/1917 | Wilkins | A01K 31/12 119/535 |
| 1,300,997 A | * | 4/1919 | Moyers | A01K 31/22 119/437 |
| 1,351,456 A | * | 8/1920 | Windahl | A01K 31/12 119/535 |
| 1,357,267 A | * | 11/1920 | Young | A01M 1/10 119/532 |
| 1,489,071 A | * | 4/1924 | Fairfield | A01M 13/00 239/44 |
| 1,491,669 A | * | 4/1924 | Bulick | A01K 31/12 119/535 |
| 1,516,639 A | * | 11/1924 | Jobe | A01K 31/12 119/535 |
| 1,566,970 A | * | 12/1925 | Ridgley | A01K 31/12 119/535 |
| 1,621,424 A | * | 3/1927 | Mcginnis | A01K 31/12 219/383 |
| 1,850,763 A | * | 3/1932 | Morley | A01K 31/12 43/107 |
| 1,980,754 A | * | 11/1934 | Henning | A01M 1/02 43/132.1 |
| 2,101,008 A | * | 11/1937 | Mayer | A01K 31/12 119/533 |
| 2,169,499 A | * | 8/1939 | Niemeyer | A01K 31/12 119/534 |
| 2,256,259 A | * | 9/1941 | Forsyth | A01K 31/12 119/534 |
| 2,280,511 A | * | 4/1942 | Forsyth | A01K 31/12 119/534 |
| 2,439,873 A | * | 4/1948 | Snyder | A01K 31/12 119/467 |
| 2,488,663 A | * | 11/1949 | Graff | A01K 31/12 401/139 |
| 2,653,575 A | * | 9/1953 | Worden | A01K 13/004 119/661 |
| 2,756,720 A | * | 7/1956 | Richmond | A01K 31/12 119/468 |
| 3,105,464 A | * | 10/1963 | Scray | A01M 1/2055 119/677 |
| 3,146,546 A | * | 9/1964 | Moore | A01M 31/008 43/131 |
| 3,147,565 A | * | 9/1964 | Moore | A01M 25/00 43/131 |
| 3,200,789 A | * | 8/1965 | Danowitz | A01K 31/12 119/468 |
| 3,294,065 A | * | 12/1966 | Myers | A01N 25/18 119/468 |
| 3,906,657 A | * | 9/1975 | Bosch | A01M 29/32 43/131 |
| 4,015,176 A | * | 3/1977 | Shanahan | A01M 23/38 361/232 |
| 4,953,320 A | * | 9/1990 | Nelson | A01M 1/02 43/132.1 |
| 4,958,456 A | | 9/1990 | Chaudoin et al. | |
| 5,099,598 A | * | 3/1992 | Carter | A01M 1/2094 43/132.1 |
| 5,261,179 A | * | 11/1993 | Schwinler | A01M 29/12 43/1 |
| 5,274,949 A | | 1/1994 | Beaton | |
| 5,471,782 A | * | 12/1995 | Brittell | A01M 1/2011 43/132.1 |
| 6,088,949 A | | 7/2000 | Nicosia et al. | |
| 6,415,545 B1 | | 7/2002 | Watanabe | |
| 6,647,926 B2 | * | 11/2003 | Te Wierik | A01K 31/12 119/532 |
| 6,866,007 B1 | * | 3/2005 | Koskey, Jr. | A01K 31/12 119/468 |
| 7,076,915 B1 | * | 7/2006 | Brooks | A01M 1/02 43/132.1 |
| 7,363,746 B2 | | 4/2008 | Spies et al. | |
| 8,479,438 B1 | * | 7/2013 | Wilhelmi | A01M 1/2094 43/132.1 |
| 8,973,300 B1 | * | 3/2015 | Smith | A01M 1/103 43/132.1 |
| 9,609,857 B2 | | 4/2017 | Nugent | |
| 10,314,299 B2 | * | 6/2019 | Ikawa | F24V 30/00 |
| 11,129,370 B1 | * | 9/2021 | Shaw | A01K 51/00 |
| 2005/0112163 A1 | | 5/2005 | Nishimura et al. | |
| 2013/0305590 A1 | * | 11/2013 | Bessei | A01K 31/12 43/132.1 |
| 2015/0143741 A1 | * | 5/2015 | Komoda | B32B 37/1284 43/114 |
| 2015/0223442 A1 | * | 8/2015 | Yamauchi | A01M 1/103 43/121 |
| 2016/0000059 A1 | * | 1/2016 | Kondo | A01M 1/103 43/121 |
| 2017/0339939 A1 | * | 11/2017 | Ikawa | A01M 1/2011 |
| 2018/0213750 A1 | * | 8/2018 | Koskey | H05B 3/42 |
| 2019/0141947 A1 | * | 5/2019 | Zha | A01K 67/033 43/1 |

FOREIGN PATENT DOCUMENTS

| | | | | |
|---|---|---|---|---|
| CN | 106386744 A | * | 2/2017 | |
| CN | 108633854 | | 10/2018 | |
| CN | 108651391 A | * | 10/2018 | |
| DE | 247703 C | * | 8/1910 | |
| DE | 1018670 B | * | 10/1957 | A01K 31/12 |
| DE | 19808745 | | 9/1999 | |
| DE | 102009039383 | | 3/2011 | |
| FR | 749170 A | * | 7/1933 | A01K 31/12 |
| FR | 867731 A | * | 11/1941 | A01K 31/12 |
| FR | 953932 A | * | 12/1949 | A01K 31/12 |
| GB | 2568602 | | 5/2019 | |
| JP | 2018130108 A | | 8/2018 | |
| JP | 6479364 B2 | * | 3/2019 | |
| JP | 2019110851 A | * | 7/2019 | |
| JP | 3229368 U | | 12/2020 | A47G 9/08 |
| WO | WO-2014030353 A1 | * | 2/2014 | A01M 1/10 |
| WO | WO-2014098579 A1 | * | 6/2014 | A01M 1/026 |
| WO | WO-2014115568 A1 | * | 7/2014 | A01K 29/00 |
| WO | WO-2018110802 A1 | * | 6/2018 | A01M 1/02 |

* cited by examiner

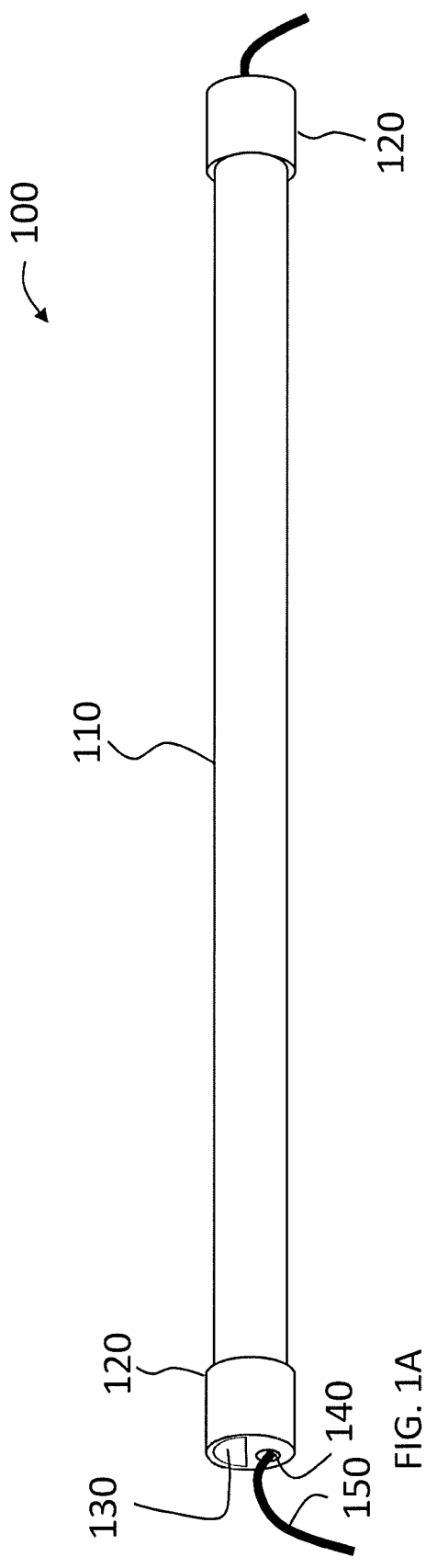
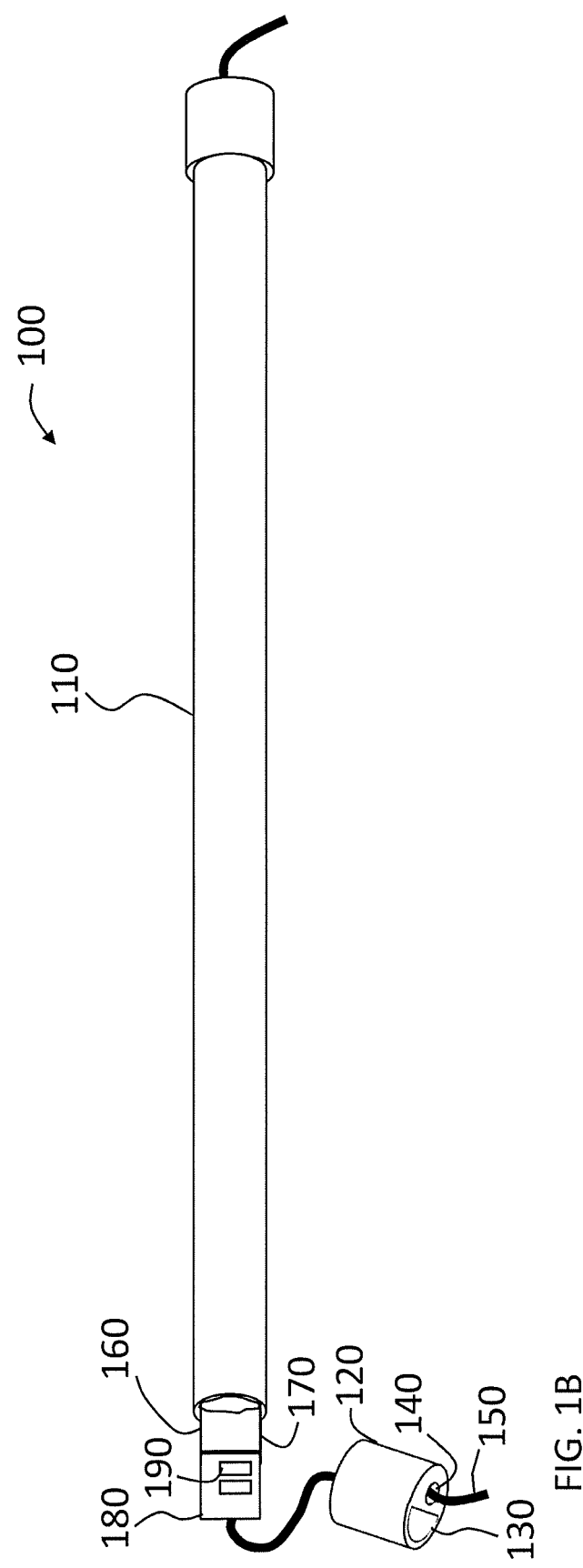

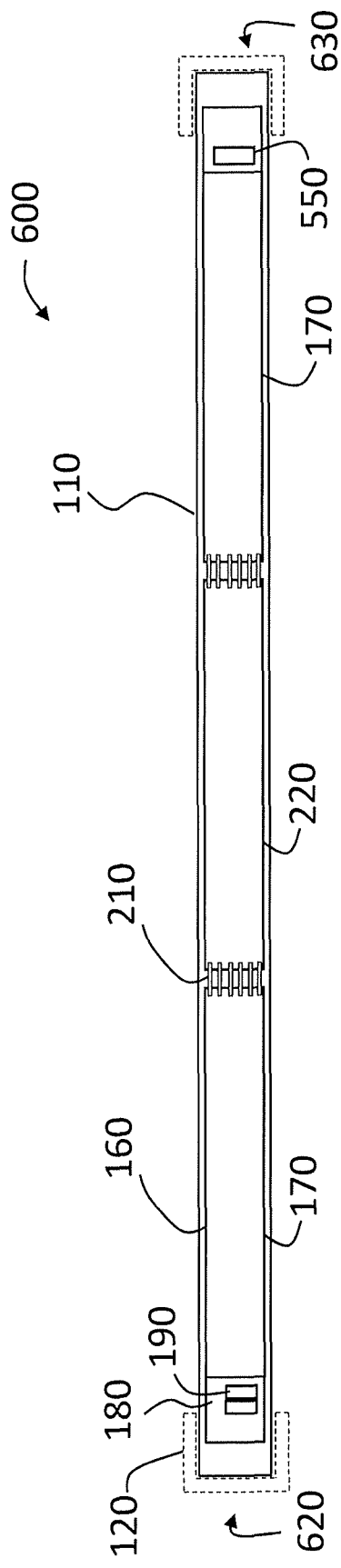
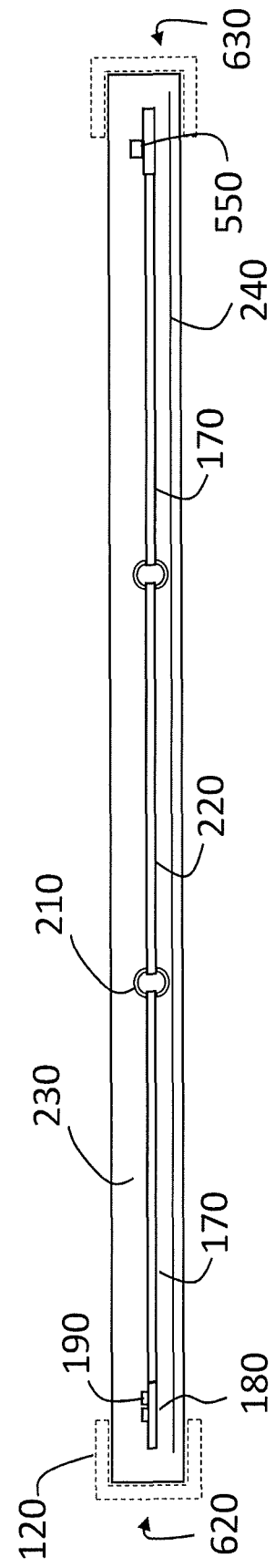
FIG. 6A
FIG. 6B

ARTHROPOD TRAP AND EXTERMINATION METHOD

CROSS-REFERENCE TO RELATED APPLICATIONS

This application claims the priority benefit of U.S. Provisional Patent Application No. 63/044,765 filed in the United States Patent and Trademark Office on Jun. 26, 2020.

BACKGROUND OF THE DISCLOSURE

Field of the Disclosure

The present disclosure relates to pest control, and, in particular, arthropod trapping and extermination in animal pens.

Description of the Related Art

Insect and arachnid pests are a pervasive problem in agriculture, particularly in poultry houses and other enclosed structures that hold animals, such as chickens. Red mites are a problem in chicken houses as red mites on chickens are analogous to fleas on dogs. The red mites parasitically suck blood from the chicken and cause a host of problems, including, reduction in egg laying, rashes, and anemia.

The presence of red mites often results in excess time spent cleaning the chicken house (or coop), nesting boxes, and bedding with disinfecting agent, as well as treatment of the chickens and the chicken house with red mite powder. Both of these procedures further disturb the chickens.

A shortcoming of some prior art arthropod pest extermination systems includes the reliance on poisons, which can be harmful to livestock that coexist in the enclosures with the arthropod pests. Further, these extermination systems often require remains to be removed and poison to be replaced. In some prior art instances, the poisons that are lawfully used in some jurisdictions are restricted from use or prohibited in other jurisdictions. Another shortcoming of some prior art pest extermination systems is their reliance on bait or pheromones that must be continually refreshed.

What is needed is an insect extermination system that attracts arthropods by providing a desirable environment for the arthropods, and then eliminates the pest with minimal waste.

BRIEF SUMMARY OF THE DISCLOSURE

The present disclosure is related to arthropod pest control in an enclosed agricultural structure, and, in particular, trapping and extermination of insects and arachnids in poultry houses.

One embodiment according to the present disclosure includes an apparatus for trapping red mites that includes a multi-segment heat strip in a housing and a controller. The heat strip preferably includes at least one inner segment or zone between two outer segments or zones. The housing is opaque to visible light to create a dark environment for the mites. It is contemplated that the shape and interior appearance of the housing may be amended in consideration of the target pest to be attracted and destroyed. It is contemplated that the housing may be transparent or translucent to visible light, but opaque to non-visible light. The controller provides electrical power to and regulates the operation of the multi-segment heat strip. The apparatus also includes an opaque, removable cap for a first opening in the housing with its own smaller opening. The apparatus may also include a second opening and a second opaque, removable cap for a second opening in the housing with its own smaller opening. The controller may be enclosed in the housing. One or more of end caps may have an additional opening for a power cord. The housing may be tubular in shape. In some embodiments, the apparatus may have a power supply, and that power supply may be disposed inside or outside of the housing.

Another embodiment according to the present disclosure includes a system for trapping arthropods, such as mites, that includes an animal or livestock house with a plurality of nesting boxes and a plurality of mite trap apparatuses. One or more of the arthropod traps may be deployed in the nesting boxes vertically, horizontally, or both. Each of the trap apparatuses includes a multi-segment heat strip in a housing and a controller. The heat strip includes at least one inner segment or zone between two outer segments or zones. The housing is opaque to visible light to create a dark environment for the arthropods. The controller provides electrical power to and regulates the operation of the multi-segment heat strip. The apparatus also includes an opaque, removable cap for a first opening in the housing with its own smaller opening. The apparatus may also include a second opening and a second opaque, removable cap for a second opening in the housing with its own smaller opening. The trap apparatuses may be wired to a power supply in series, parallel or a combination thereof.

Another embodiment according to the present disclosure includes a method of exterminating arthropods, such as mites, using an arthropod trap apparatus. The trap apparatus includes a multi-segment heat strip in a housing and a controller. The heat strip includes at least one inner segment or zone between two outer segments or zones. The housing is opaque to visible light to create a dark environment for the mites. The controller provides electrical power to and regulates the operation of the multi-segment heat strip. The apparatus also includes an opaque, removable cap for a first opening in the housing with its own smaller opening. The apparatus may also include a second opening and a second opaque, removable cap for a second opening in the housing with its own smaller opening. The controller may be enclosed in the housing. One or more of end caps may have an additional opening for a power cord. The housing may be tubular in shape. In some embodiments, the apparatus may have a power supply, and that power supply may be disposed inside or outside of the housing. The method energizing the at least one inner segment or zone and the two outer segments or zones to a first temperature for a first selected period; changing the temperature of the two outer segments or zones to a second temperature for a second selected period; and changing the temperature of the at least one inner segment or zone and the two outer segments or zones to a third temperature for a third selected period. The first temperature may be about the brooding and egg laying temperature of a target animal, the second temperature is greater than the first temperature, and the third temperature is greater than the second temperature and sufficient to exterminate the insects. In some embodiments, the first temperature is about 28 degrees Celsius and the third temperature is preferably about 45 degrees Celsius. In some embodiments, the first temperature is about the brooding temperature of an egg laying chicken and the third temperature is high enough to kill red mites within 15 minutes.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 1A is a 3-D diagram of an insect trap apparatus according to one embodiment of the present disclosure;

FIG. 1B is a 3-D diagram of the insect trap apparatus of FIG. 1A with a cap removed;

FIG. 6A is a cross-section schematic of another embodiment of the insect trap apparatus with power source access on one side and controller access on the other side;

FIG. 6B is a cross-section schematic of the insect trap apparatus of FIG. 6A rotated by 90 degrees.

DETAILED DESCRIPTION OF THE DISCLOSURE

Figure 2A:
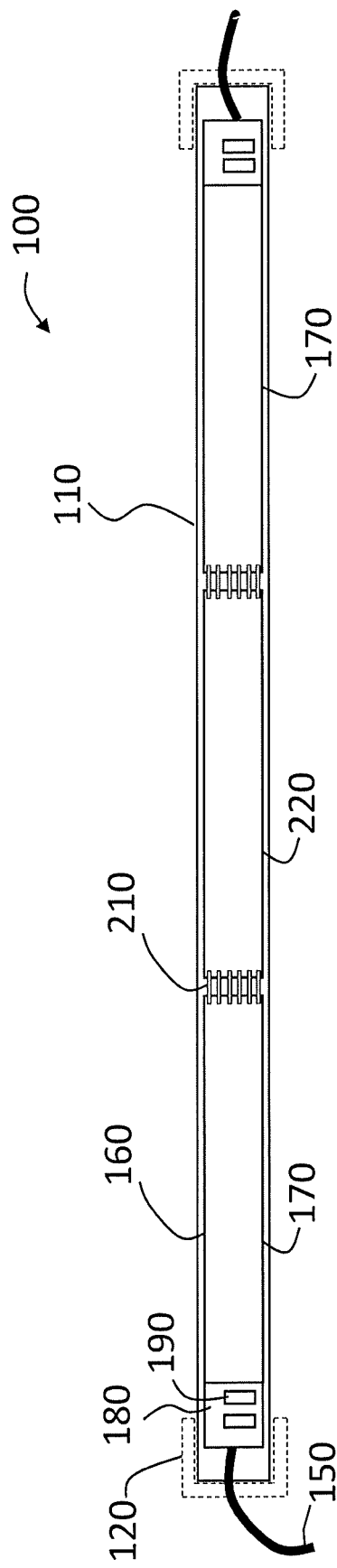
FIG. 2A is a cross-section schematic of the insect trap apparatus of FIG. 1A with a heat strip.

Generally, the present disclosure relates to apparatuses and methods for pest control in a farm or agricultural setting, and, in particular, arthropod trapping and extermination in animal pens. The present disclosure is susceptible to embodiments of different forms. They are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

FIGS. 1A-1B show 3-D diagrams of an arthropod trap 100 according to one embodiment of the present disclosure. FIG. 1A shows that the arthropod trap 100 may include a housing 110, one or more end caps 120 with an opening 130 for arthropods, such as red mites, a heat strip 160, a printed circuit board 180, and an optional opening 140 for a power cord 150. The housing 110 defines an open space 230. The power cord 150 may be routed through opening 130 as an alternative to opening 140. The opening 140 may be smaller than the opening in the housing 110 in order to allow ingress of the mites while reducing the entry of debris and water into the housing 110. The housing 110 is preferably opaque to visible light such that the housing has an interior that is dark. The housing 110 may be made of a lightweight material such as PVC, or other materials but is not limited to such, as metal and plastic may be used. The tubular shape and PVC composition are illustrative and exemplary only, as the housing 110 may have any shape or material so long the housing 110 provides a dark interior to attract the red mites. In some embodiments, the housing 110 may be thermally insulated. It is contemplated that a heat source may be position outside the housing or between housing layers, wherein heat is radiated into the open space 230. While the housing 110 is shown as a tubular, is may be shaped as necessary, including but not limited, into a circlet for a flea collar used with canines and felines.

FIG. 1B shows the insect trap 100 with the cap 120 removed. It is contemplated that the cap 120 is optional, wherein an end of the trap 100 may be left open, or the trap 100 is formed of a molded structure comprising one or more openings suitable for insertion of a heat strip, the routing of a power supply (as desired), and ingress of pests into the trap 100. In some preferred embodiments, the cap 120 may be fixed to the trap 100. The heat strip 160 may be an electrically-powered heat source configured to be received by the housing 110. The heat strip 160 may be a heating pad material, heating film adhered to a backing material, heat mat, heat bulb, or any other device that can create heat to obtain the target temperatures required for the trap 100. The heat strip 160 may include outer segments or zones 170 and an inner segment or zone 220 (see FIGS. 2A-2B) that are in electrical communication with the printed circuit board 180. It is contemplated that the heat strip 160 may comprise other shapes and configurations suitable for use in the housing 110. For example, the heat strip 160 may be cylindrical and/or comprise a single segment having one or more heating zones. The printed circuit board 180 may include a controller 190 for regulating the amount of electrical power that is transmitted to the heat strip 160. The controller 190 may control programming of the segments 170, 220, relay temperature data, power consumption and fault information to a computer and user interface. The controller 190 may also include security features to prevent overheating, electrical faults, and malfunctions. In some embodiments, the controller 190 may include a wireless transmitter and/or receiver for implanting instructions and transmitting data without a wired connection. While the controller 190 is shown with two integrated circuit chips, this is exemplary and illustrative only, as the controller 190 may be implemented with any number of chips. The controller 190 regulates power and the time when power is applied to the heat strip 160. As shown, the printed circuit board 180 receives power from a power cord 150. While the cap 120 includes a power cord opening 140 for the power cord 150, this is optional because some embodiments may include an energy storage device, such as a battery to power the trap 100. Thus, in some embodiments, the cap 120 may only have an opening 130 for the bugs to enter and not the opening 140. The trap 100 may be wirelessly charged and/or powered. In some embodiments, the energy storage device may be electrically coupled to the printed circuit board 180. In some embodiments, the energy storage device may be disposed within the housing 110, whereas, in other embodiments, the energy storage device may be disposed outside of the housing 110.

Figure 2B:
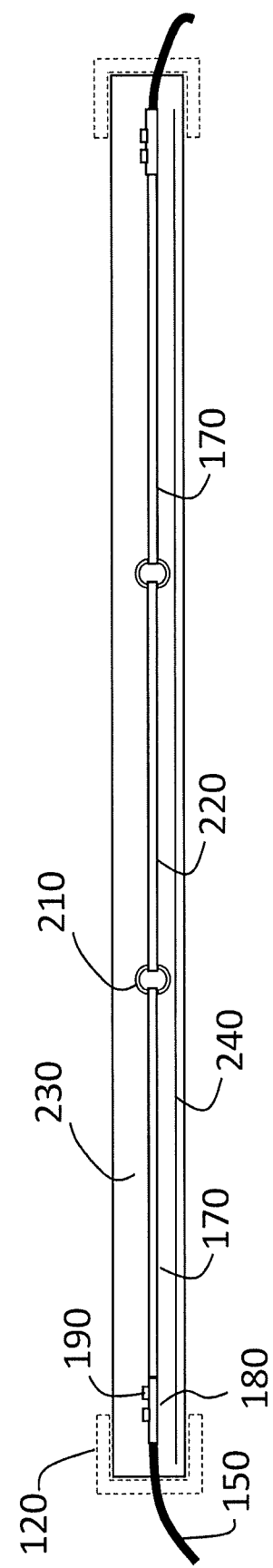
FIG. 2B is a cross-section of the insect trap apparatus rotated by 90 degrees.

FIGS. 2A-2B show schematic diagrams of the trap 100. FIG. 2A shows a view where the heat strip 160 is lying flat, while FIG. 2B shows a view where the heat strip 160 is on its edge. The heat strip 160 may be divided into three or more segments or zones 170, 220. Each of these segments 170, 220 may be independently controlled by the controller 190. Adjacent heat strip segments 170, 220 may be electrically connected through couplers 210 that allow different amounts of power to be distributed to the segments 170, 220. This means that the all the segments 170, 220 may be heated to the same temperature in a first mode, and the inner segment 220 may be heated to a different temperature than the outer segments 170 in a second mode. The segments 170, 220 may be flat and thin in order to further define the open space 230 within the housing 110 to allow ingress of the mites. In some embodiments, part or all the segments 170, 220 may be treated by attractants such as pheromones or bait. In some embodiments, a removable flat strip 240 may be disposed in the housing 110 to catch the remains of exterminated insects. The flat strip 240 may be removed, cleaned, and either returned or replaced.

Figure 3A:
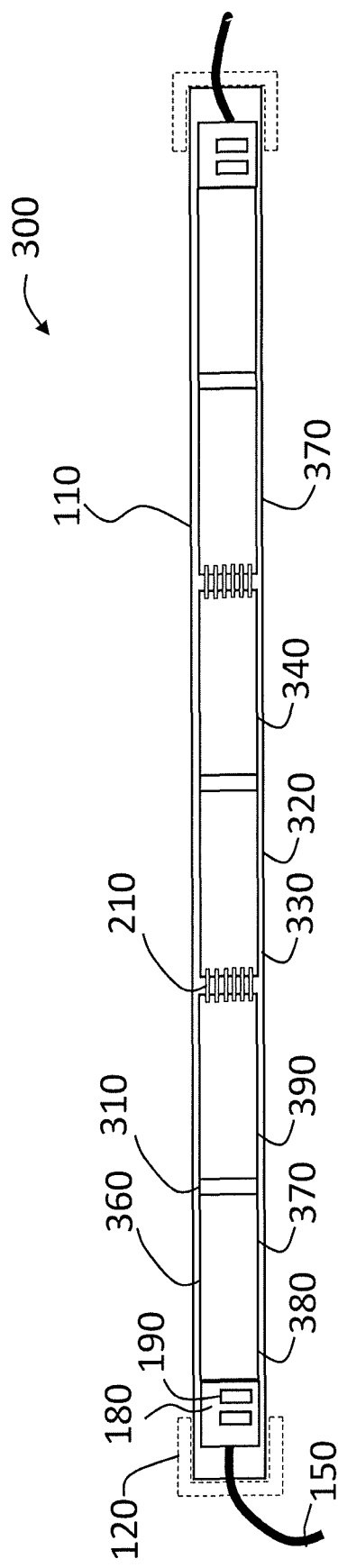
FIG. 3A is a cross-section schematic of another embodiment of the insect trap apparatus.
Figure 3B:
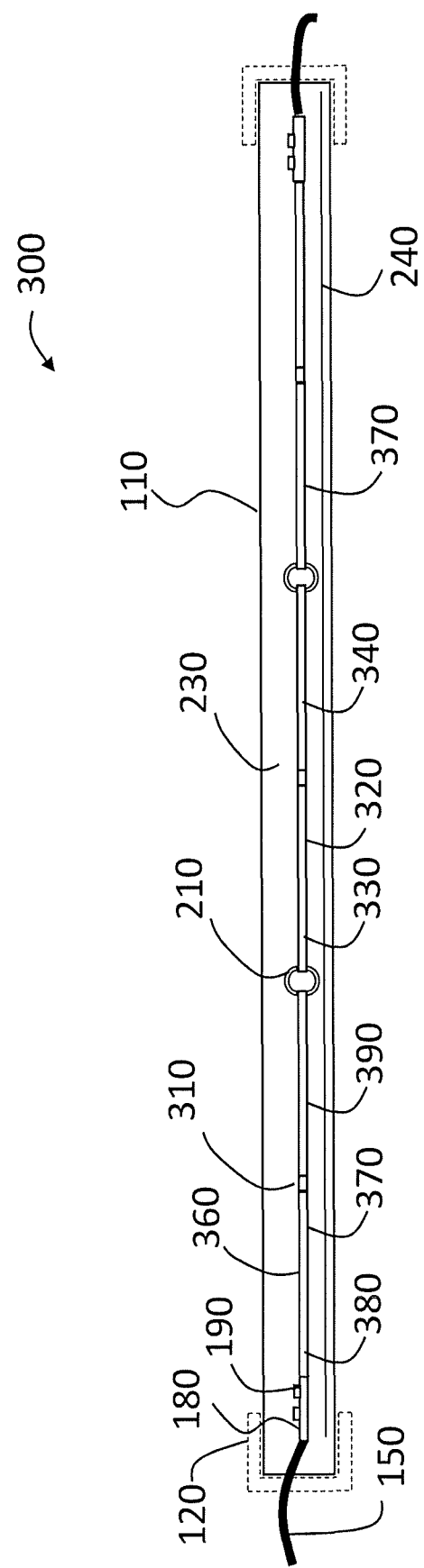
FIG. 3B is a cross-section schematic of the insect trap apparatus of FIG. 3A rotated by 90 degrees.

FIGS. 3A-3B show schematic diagrams of another trap 300 according to the present disclosure. The trap 300 includes many of the elements of the trap 100; however, the trap 300 includes a heat strip 360. The heat strip 360 is in electrical communication with the printed circuit board 180, which powers and regulates the heat strip 360. The heat strip 360 includes outer heating elements 370 and inner heating elements 320. The outer heating elements 360 each include a first portion 380 and second portion 390 that are connected by a flexible electrical connection 310. The inner heating element 320 includes a first portion 330 and a second portion 340 that is also connected by a flexible electrical connection 310. The flexible electrical connections 310 allows the heat strip 360 to be more easily maneuvered into and out of the housing 110, especially if the housing 110 has a non-uniform shape.

Figure 4:
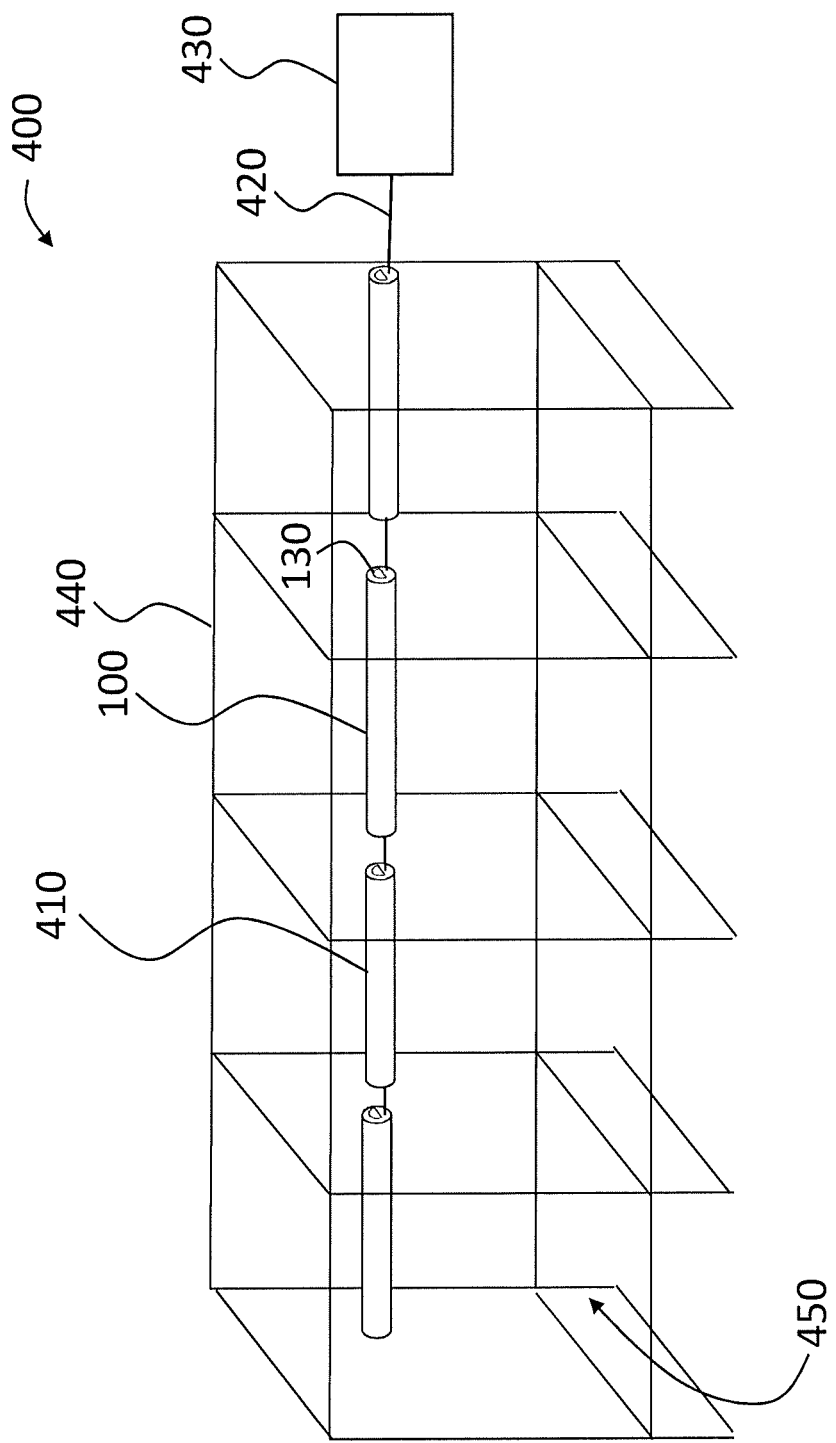
FIG. 4 is a wireframe schematic of an array of insect traps deployed in a set of nesting boxes according to one embodiment of the present disclosure.

FIG. 4 shows a schematic diagram of a system 400 that includes an array 410 of arthropod traps 100 deployed in nesting boxes 440 or near an aviary perch. As shown, the array 410 shows a set of traps 100 deployed in series; however, the insect traps 100 may be deployed in series, parallel or both as desired. While the array 410 is shown in horizontal form, some embodiments may include vertical, horizontal, or angled orientations of the individual traps 100. While only four traps 100 are shown in the array 410, a person of skill in the art would understand that arrays 410 with between 1 and over 100 traps 100 may be implemented. For large chicken houses and the like, the array 410 may be over 100 meters in length. One or more of the traps 100 may be disposed such that the opening 130 is in physical contact with the interior volumes 450 of the nesting boxes 440. Power may be supplied to the array 410 via a power cable or cord 420 from an external power source 430, such as an electrical grid, generator, or stored energy device. While the system 400 is shown deployed in a series of nesting boxes, a person of skill in the art would understand that the system can be placed in any housing with undesirable pests, including, but not limited to, stables, hotel rooms, and residential/commercial structures.

Figure 5A:
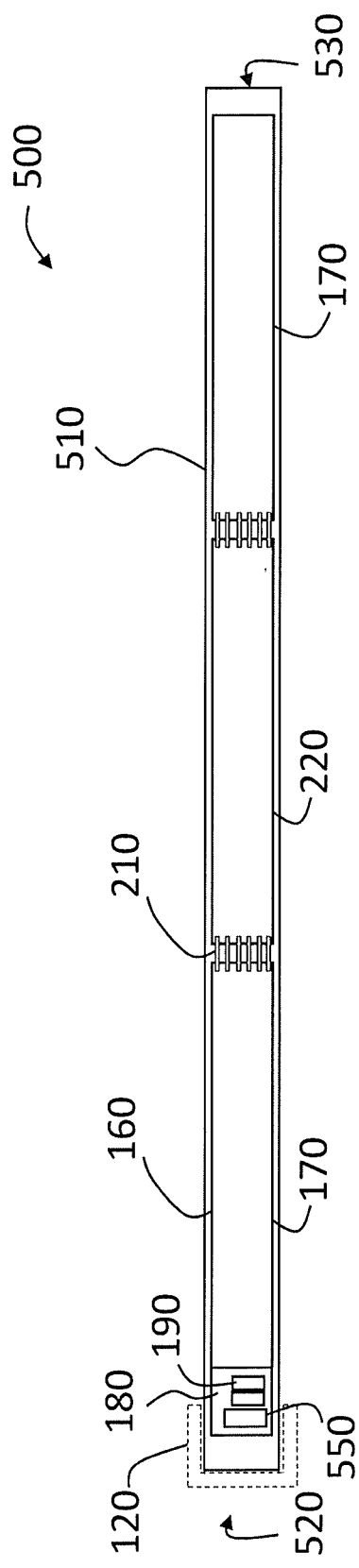
FIG. 5A is a cross-section schematic of another embodiment of the insect trap apparatus with only one capped end.
Figure 5B:
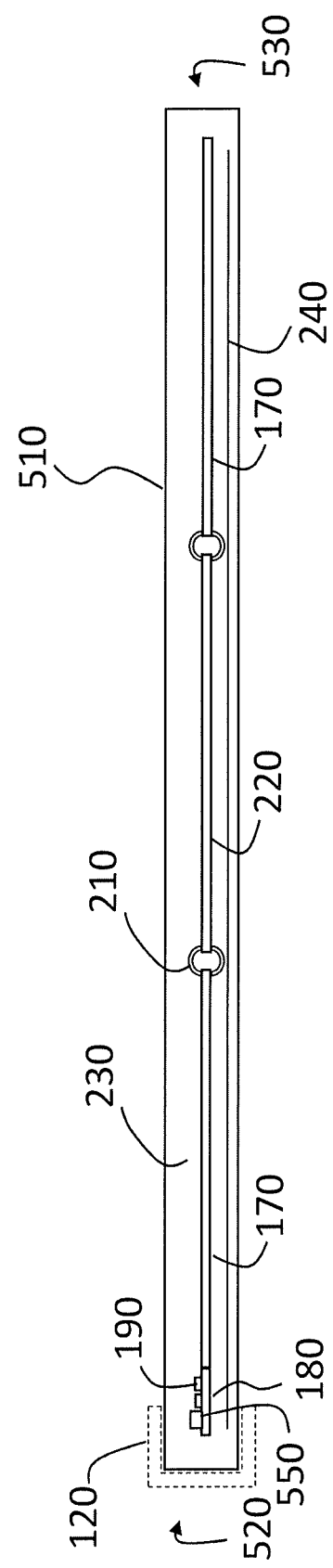
FIG. 5B is a cross-section schematic of the insect trap apparatus of FIG. 5A rotated by 90 degrees.

FIGS. 5A-5B show schematic diagrams of another trap 500 according to the present disclosure. The trap 500 includes many of the elements of the trap 100; however, the trap 500 includes a power supply 550, such as a battery, in electrical communication with the printed circuit board 180, such that the trap 500 does not require connection through an electrical cord 150 to receive electrical power. The housing 510 is different from the housing 110 in that the housing 510 is configured to allow human access on the first side 520 and not the second side 530, and, thus, only requires a single end cap 120. As shown, the power supply 550 is mounted on the same printed circuit board 180 as the controller 190 and the insect trap 500 only has an end cap 120 on one side. In some embodiments, the second side 530 of the housing 510, may have an optional opening to allow red mites access to the interior of the housing 510. The optional opening may be configured to allow the passage of the red mites but be too small for human access to the heat strip 160 or the removal of the heat strip 160 from the housing 510.

FIGS. 6A-6B show schematic diagrams of another arthropod trap 600 according to the present disclosure. The trap 600 includes many of the elements of the trap 500; however, the trap 600 has the housing 110 with a first opening 620 and a second opening 630, one on each end and each with an end cap 120. Just as the apparatus 500, there is a power supply 550, such as a battery, in electrical communication with the printed circuit board 180, such that the insect trap 500 not require connection through an electrical cord 150 to receive electrical power. However, as shown, the power supply 550 is mounted on the printed circuit board 180 near the second opening 630 which is opposite the first opening 630 where the controller 190 is mounted on another printed circuit board 180. Thus, the power supply 550 may be accessed by removing the end cap 120 on the second opening 630 and the controller 190 may be accessed by removing the end cap 120 on the first opening 620.

Figure 7:
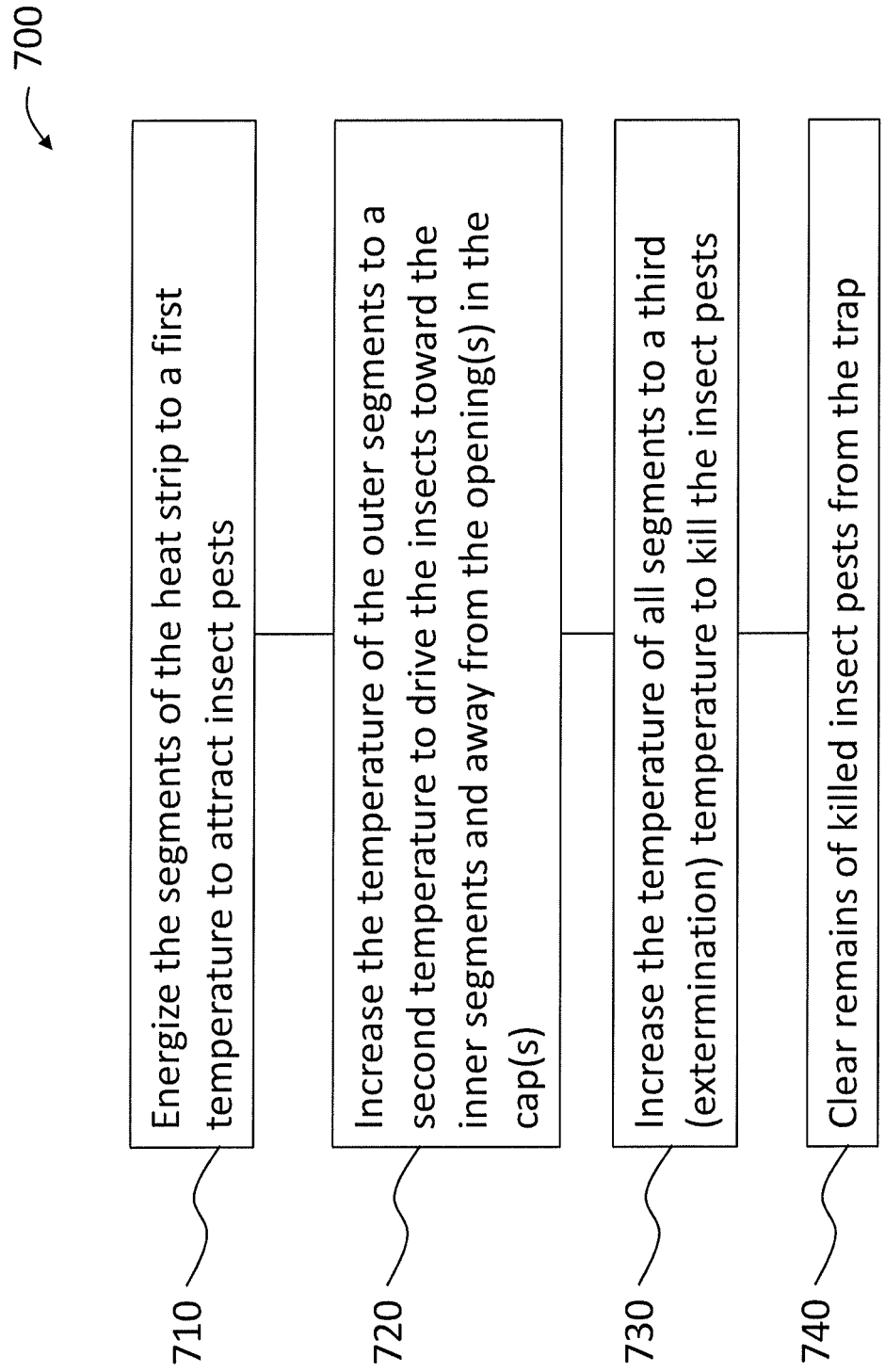
FIG. 7 is a flow chart of a method of exterminating insect pests according to one embodiment of the present disclosure.

FIG. 7 shows a method 700 of operating a trap 100, 300, 500, 600 according to one embodiment of the present disclosure. In step 710, the segments 170, 220 are energized to warm the interior of trap 100 to a first temperature of about 28 degrees Celsius, which is the brooding temperature of egg laying chickens and the preferred temperature of the red mites. This first temperature attracts the red mites into the opening 130 and is maintained for a first selected time or range of times to attract these insect pests. In some embodiments, the first selected time period may be 6 to 23 hours in order to allow the red mites to gather, breed, and lay eggs within the insect trap 100, 300, 500, 600. Since the red mites prefer dark places, the open space 230 becomes a preferred location for the red mites, which will crawl onto the heat strip 160. As a person of skill in the art would understand, the first temperature may be adjusted to the brooding and egg laying temperature of any target animal in order to lure the pest (not just red mites) into the insect trap 100, 300, 500, 600. The red mites are exemplary and illustrative, as the pests may include any nuisance insect, such as bed bugs and fleas. The trap temperature can be set to any specific needed temperature to attract another species that has another preferred temperature. The preferred temperature may be maintained the entire day, or set on a curve if a target species prefers such temperatures and such an arrangement corresponds better to its natural behavior. This excludes the time used to kill the pest with a lethal dose of high temperature, which in the case of red mites is 45 degrees Celsius or higher. In step 720, the temperatures in the outer segments 170 are increased from the first temperature to a second temperature that is uncomfortable to the insect pests in order to motivate them to move toward the inner segment 220. Since the red mites desire to avoid the light, they will tend to move toward the inner segment 220 (which is still at the more comfortable first temperature) instead of the opening 130 when moving away from the warmer temperature of the outer segments 170. The second temperature is maintained for a second selected period and provides suitable time for the red mites to migrate toward the inner segment 220. In step 730, the temperature of the segments 170, 220 is increased a third temperature of about 45 degrees Celsius for a third selected period in order to kill the red mites. In some embodiments, the third selected period is about 10 to 15 minutes. As would be understood by a person of skill in the art, the third temperature (e.g. extermination temperature) and the period may be varied based on the type of insect pest. In step 740, optionally, air may be forced through the trap 100 to displace the remains of the exterminated red mites, often in the form of mite dust. After step 730, steps 710-730 may be repeated to attract and kill red mites during each iteration. Other sequences for heating heat strip 160 are contemplated. For example, it is possible that one or more of the segments 170, 220 may be heated out of sequence with other segments 170, 220, whether to the first, second, or third temperatures. Further, any number of preferred temperatures may be used to preferably coincide with the number of segments 170, 220 comprising the heat strip 160.

While the disclosure has been described with reference to exemplary embodiments, it will be understood that various changes may be made, and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An apparatus for attracting and exterminating arthropods, the apparatus comprising:
    a heat strip, comprising:
        at least one inner segment or zone that is energizable to a first temperature;
        at least two outer segments or zones, wherein at least one of the at least two outer segments or zones is energizable to a second temperature, and wherein the at least one inner segment or zone is disposed between the at least two outer segments or zones;
    a controller in electrical communication with each of the segments or zones of the heat strip, wherein the controller is configured to regulate power to the heat strip so as to selectively energize each of the segments or zones of the heat strip;
    a housing defining an interior volume to enclose the heat strip, wherein the housing is opaque to visible light and includes a first opening; and
    a first removeable cap configured to close the first opening, the first removable cap being opaque to visible light and comprising at least one opening;
    wherein the controller regulates the first and second temperatures such that, due to the regulation by the controller, the first temperature is either selectively and concurrently equal to the second temperature or the first temperature is selectively and concurrently different from the second temperature;
    wherein one of the first and second temperatures is sufficient to attract at least one of the arthropods into the housing; and
    wherein an other of the first and second temperatures is sufficient to exterminate at least one of the arthropods within the housing with a lethal dose of high temperature.

2. The apparatus of claim 1, wherein the housing further comprises:
    a second opening, and
    a second removable cap configured to close the second opening, the second removable cap being opaque to visible light and comprising at least one opening.

3. The apparatus of claim 1, wherein the controller is disposed within the housing.

4. The apparatus of claim 3, where the at least one opening of the first removable cap comprises:
    a first opening; and
    a second opening;
    wherein the first opening is larger than the second opening, and the second opening is dimensioned to allow a power cord to pass through.

5. The apparatus of claim 1, wherein the housing is tubular in shape.

6. The apparatus of claim 1, further comprising:
    a power supply in electrical communication with the controller.

7. The apparatus of claim 6, wherein the power supply is disposed within the housing.

8. The apparatus of claim 1, wherein the arthropods are red mites.

9. A method for attracting and exterminating arthropods, wherein an apparatus for attracting and exterminating arthropods comprises:
    a heat strip, comprising:
        at least one inner segment;
        two outer segments, wherein the at least one inner segment is disposed between the two outer segments;
    a controller in electrical communication with each of the segments of the heat strip and configured to regulate power to the heat strip;
    a housing defining an interior volume to enclose the heat strip, wherein the housing is opaque to visible light and includes a first opening; and
    a first removeable cap configured to close the first opening, the first removable cap being opaque to visible light and comprising at least one opening;
    the method comprising the steps of:
    energizing the at least one inner segment and the two outer segments to a first temperature for a first selected period;
    changing the temperature of the two outer segments to a second temperature for a second selected period;
    changing the temperature of the at least one inner segment and the two outer segments to a third temperature for a third selected period;
    wherein the first temperature is about the brooding and egg laying temperature of a target animal, the second temperature is greater than the first temperature, and the third temperature is greater than the second temperature and sufficient to exterminate the arthropods.

10. The method of claim 9, wherein the first temperature is about 28 degrees Celsius and the third temperature is about 45 degrees Celsius.

11. The method of claim 9, wherein the first temperature is about the brooding and egg laying temperature of the target animal which is an egg laying chicken and the third temperature is high enough to kill red mites within 15 minutes.

12. The method of claim 9, wherein the arthropods are red mites.

* * * * *